June 13, 1967

W. Y. STEVENS 3,325,785

EFFICIENT UTILIZATION OF CONTROL STORAGE AND ACCESS CONTROLS THEREFOR

Filed Dec. 18, 1964

2 Sheets-Sheet 1

INVENTOR
WILLIAM Y. STEVENS
BY Robert Lieber
ATTORNEY

United States Patent Office 3,325,785
Patented June 13, 1967

3,325,785

EFFICIENT UTILIZATION OF CONTROL STORAGE AND ACCESS CONTROLS THEREFOR

William Y. Stevens, Poughkeepsie, N.Y., assignor to International Business Machines Corporation, New York, N.Y., a corporation of New York Filed Dec. 18, 1964, Ser. No. 419,403
9 Claims. (Cl. 340—172.5)

The present invention relates to an organization of microprogram controls for a data processing system, and particularly to a method for increasing the efficiency of utilization of a control store and to access controls required therefor.

In present day computers sequencing controls having improved uniformity of design, increased efficiency, and improved simplicity and flexibility, can be produced by the use of micro-programming techniques. A designer of such controls starts with a list of major order codes, or macroinstructions, which represent gross functions to be performed by the computer, and translates each of these into a series of basic micro-operations, or elemental system states. Each micro-operation is controlled by a corresponding micro-instruction word contained in a control storage matrix of permanent or semi-permanent construction. And for access to this matrix, to implement the basic micro-program sequences, basic access controls are provided which are sequentially responsive in part to signals derived from current matrix outputs and in part to branch control signals derived from sources external to the controls. Thus, the conditions of the latter signals are, in general, indeterminate or variable.

To the extent that access to the control store is controlled by the current microinstruction output of that store, the selection of the next microinstruction address may be said to be predetermined. Thus, the size or range of the group of control storage addresses from which the next address will be selected is determined only by the range of the independently varying branch control signals. Usually the maximum number of branch choices (i.e. the widest range) is fixed by selecting a predetermined number of branch control signals from a larger field of variable signals, in accordance with conditions to be met by the microprogram.

It is in this area mainly that the problem solved by the subject invention presents itself. Assume, for example, that two variable binary branch control signals, selected from a larger set of signals in each cycle of access to the control store, are used to deterimne the next microinstruction address in that store. Since the values of these two signals will not be predetermined at the time of selection the address of the next microinstruction may be any one of a group of $2^2=4$ addresses. Accordingly, at each of these four addresses in the control store a microinstruction is provided for executing the micro-operation corresponding to the branch decision associated with that address. This is fine if the microprogram design calls for four distinct decisions to be made, and therefore for one of four different micro-operations to be performed. And even if the design requires only two distinct choices to be made it is a simple matter to substitute a signal of predetermined value for one of the two branch control signals in accordance with information in the microinstruction from which the branch is to be made.

But suppose that the microprogram designer must implement a choice of one of three branch actions. This is quite another matter. What is ordinarily done in such cases, and is usually adequate, is to provide a superfluous choice by filling four branch addresses in the control store with three different microinstructions and one redundant microinstruction.

As was stated this would usually be adequate, but if control storage space is limited, for example by restrictions established in the design specification to meet price and performance criteria, each wasted microinstruction word space can be quite significant. For example, in the design of one particular system in which the specifications called for 2,816 microinstructions, each 90-bits in length and each selected in accordance with the state of either one or two independently varying branch control signals (i.e. two-way or four-way conditional branching), it was found that almost all of the control storage matrix space was required to implement the immediate program order and processing codes, so that the amount left in reserve was then insufficient to meet requirements initially specified for reserve. In analyzing the situation more closely, it was found that in excess of one hundred microinstructions would be redundant, since they represented superfluous fourth possibilities in three-way branches. The two branch control bits by which these instructions were addressed were capable of ranging through all of four code combinations (i.e. 00, 01, 10 and 11). If one of these bits was directly masked or controlled so that its value was predetermined (e.g. 1) the range of the two bits could be decreased to two values (e.g. 10 and 11) but not to three.

Another observation made in connection with the above evaluation of the use of the control store, concerned the microinstructions which were reached through two-way address branches (i.e. with one of the two branch control bits set to a constant). It was noted that a considerable number of these microinstructions were also superfluous, because they were reached by branches in two parallel paths in which only three distinct micro-operations are called for by the program design.

These and other observations led to the development of the simple yet effective alternative approach which constitutes the basis for the subject invention. The observations can be readily extended to apply to a control store addressing system involving any number $n$ of independently varying branch bits. In general, the problem is to be able to limit the range of variation of $n$ variable address selection bits to a number of address values M, where M is not a power of 2, so that hitherto required "filler," or redundant microinstructions can be eliminated from the control store by a microprogram designer.

An object of this invention is to provide microprogram controls by means of which the inefficient use of redundant microinstructions as characterized above, may be avoided.

Another object is to provide microprogram access controls which can be made to respond variably to an $n$-digit variable branch control signal ranging over a $2^n$-value address code to control selections of microinstruction addresses from variable-sized groups of M addresses, where the value of M can be restricted to at least one value which is not a power of 2.

Another object is to provide control storage access controls for cyclically selecting microinstruction addresses, each with reference to a combination of $n$ binary branch control signals, and for conditionally restricting the range of variation of any such combination to a set of M values where M is not an integral power of the base of the combination.

Yet another object of the invention is to provide cyclically operable control storage addressing controls which can perform cyclic selections of addresses in accordance with selected combinations of variable binary branch control signals, and which can be conditioned in accordance with current micro-instruction information to respond to any such combination to select one address from a number M of distinct addresses, where M either is or is not a power of 2 according to the condition of said addressing controls.

Another object is to provide cyclically operable control storage addressing controls which can be conditioned in one cycle of utilization of said store, to select a next address in said store in accordance with an M-valued code combination of *n* binary branch control signals, where M is a variable which can have a value which is not a power of two.

Another object is to provide cyclically operable control storage addressing controls which can be conditioned by successive outputs of control storage, over a plurality of addressing cycles, to select a series of control storage addresses in accordance with a corresponding series of variable binary branch control signal combinations, while the effective range of variation of said combination over said cycles is restricted to include a number of values which is not a power of 2.

In accordance with these objects a feature of the invention involves the provision of a branch control bit translating and converting circuit which is interposed between otherwise conventional branch bit selection and addressing controls of a control storage matrix. This circuit can be conditioned to a number of different states whereby all of the branch bits may either be translated unchanged, or one or more bits may be transformed according to a function of the instantaneous values of all of the bits, whereby the number of bits applied to the addressing controls remains invariant, but the number of distinct combinations of these bits varies between two numbers, one of which is not a power of 2. In particular, two branch bits, which would ordinarily provide either a two-way or a four-way address selection branching choice, can be conditionally manipulated by this circuit to effect three-way branches.

These and other objects and features of the invention may be more fully understood and appreciated by considering the following detailed description thereof in association with the accompanying drawing wherein.

Figure 1:
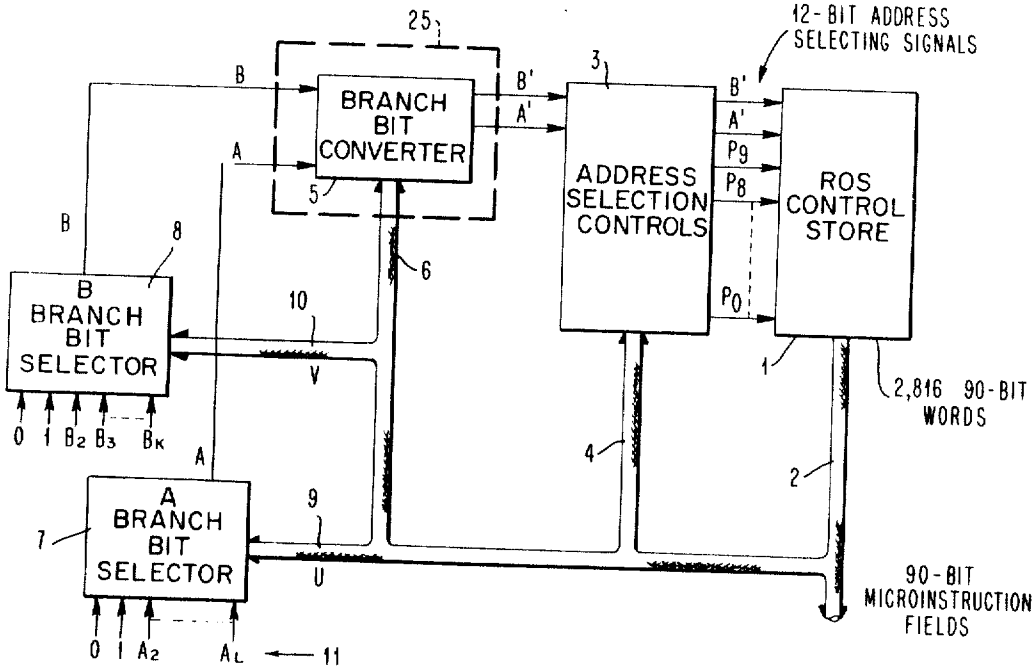
FIG. 1 is a schematic block drawing illustrating a general organization of microprogram controls in a data processing system and the relationship thereto of the translating and converting circuit of this invention.

Referring to FIG. 1, microprogram controls in one particular system functioning in accordance with this invention comprise a capacitor read-only store 1, also designated ROS, which is an array of crossed wires at the intersections of which capacitances of different value are provided. Such stores are well-known; a typical store for example being generally disclosed in the IBM Technical Disclosure Bulletin of January 1963, vol. 5, No. 8, pages 47–48, in an article by C. E. Owen et al., entitled, "Read Only Memory." The store 1 contains approximately 2,816 rows, each comprising a different 90-bit word (90 columns) of control information. In each cycle of operation of the associated computer system (not shown) a signal field corresponding to one of the 2,816 90-bit words stored in ROS is produced at 2 in response to a twelve-bit address signal furnished by address selection control circuit 3. The circuit 3 is controlled in part by signals derived from the current output of ROS, as indicated at 4 and in part by a pair of variable binary branch control signals A′ and B′ which are produced by the branch bit converter circuit 5 of this invention from respective input branch bits A and B. The circuit 5 is controlled by other information in the current output field of ROS as indicated at 6. Another set of inputs to the circuit 3, which is not shown, is derived from order codes in variably stored program instructions which are interpreted as conditional function branch bits by the system shown in FIG. 1. Such inputs are not shown since they are not relevant to the subject variable branching operations of the system.

The signals A and B are in turn derived from respective A and B sets of externally originating signals through respective A and B selector circuits 7 and 8, which are controlled by other information U and V in the current ROS output field as indicated at 9 and 10, respectively. The structure and operation of circuit 5 is described more fully below with reference to FIGS. 3 and 4.

The A branch bit is selected from a plurality of sources indicated at 11. These sources are respectively designated $A_0, A_1, A_2 \ldots A_L$. $A_0$ and $A_1$ are constant signals having respective values representative of binary integers 0 and 1. $A_2 \ldots A_L$ have variable binary values The signals $A_0 \ldots A_L$ are respectively selected by corresponding combinations $U_0, U_1 \ldots U_L$, of the microinstruction code segment U. In this particular embodiment U contains six bits and is therefore capable of controlling the selection of a maximum of $2^6=64$ different items. Hence L is an integer less than 64.

The B branch bit is selected from the field $B_0, B_1 \ldots B_k$ where $B_0$ and $B_1$ are signals of constant binary value (0 and 1 respectively) and all of the others are variable. For reasons not directly pertinent to the present invention V is a 5-digit set capable of representing 32 different combinations, K of which, designated $V_0, V_1 \ldots V_k$, are effective to control the respective selections of constant signals 0 and 1, and branch variables $B_2 \ldots B_k$, where *k* is an integer less than 32.

If bits A and B are both selected from among the variable sources in the respective A and B sets, in any one cycle of selection they may assume any one of the four combinations of binary states 00, 01, 10, or 11, and thereby condition the controls 3 to select the next microinstruction address in any one of four different ways. On the other hand, if the value of A or B is predetermined by a selection of a constant signal (e.g. $A_0$) the range of such conditional selection is narrowed down to two possibilities, or to one unconditional choice if both A and B are predetermined.

For example, if the value of A selected by U is predetermined to be 0, by the inclusion of the combination $U_0$ in the current microinstruction field, the state of AB (00 or 01) will depend only on the state of B, and therefore the next microinstruction selection may be based on a corresponding two-way branch address choice. If the values of A and B are both simultaneously predetermined, the address of the next microinstruction may be unconditionally predetermined.

The foregoing circuits are operated cyclically by basic timing control signals (not shown) so that in each basic computing cycle a pair of signals A, B is selected and variably translated as the pair A′B′ to circuit 3. This circuit selectively combines A′ and B′ with the predetermined 10-bit signal P $(=P_0P_1 \ldots P_9)$ to form the 12-bit address of the next microinstruction to be recovered from the store 1. During the same cycle the store 1 produces an output field 2 from an address determined by the 12-bit output of circuit 3 in the previous cycle.

Figure 2:
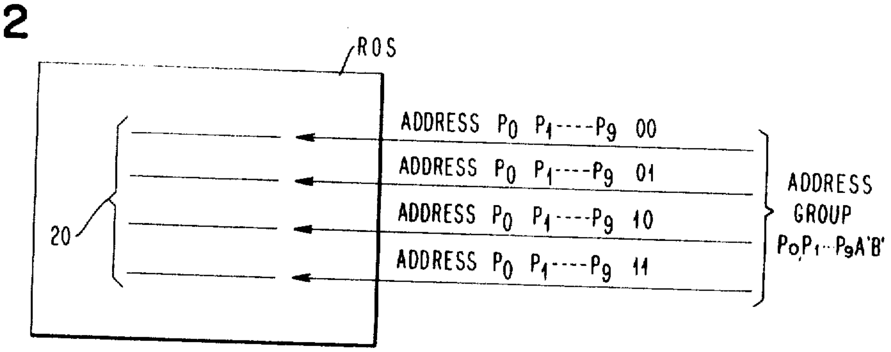
FIG. 2 is a diagrammatic representation of a control store illustrating a range of successor addresses from which an address may be selected in one cycle of the microprogram controls shown in FIG. 1.

The P-field signals $P_0$ to $P_9$ are predetermined in accordance with the control field information at 4, and therefore the combinations of the P-field and the possible values of the variable bits A′ and B′ define a group of addresses 20 in ROS, as indicated in FIG. 2. In each such group there are a maximum of four addresses which are specified as a group by $P_0$ to $P_9$ and individually by the actual conditions of bits A′ and B′. The latter bits can range over the set 00, 01, 10, and 11 as shown in FIG. 2 and thereby, in any one cycle, they can specify any one of four addresses within a selected group 20.

The most distinctive element of the system shown in FIG. 1 is the branch converter 5 within the broken outline 25 and its action in cooperation with the other circuits to conserve control storage space by conditionally transforming a 4-valued code into one of several 3-valued codes (in general M-valued codes, where M is other than an integral power of 2).

The branch bit converting circuit 5 comprises a pair of OR circuits 33 and 34, a pair of inverting circuits 35 and 36, and four AND circuits 37–40. OR circuit 33 combines the outputs of AND circuits 37 and 38 with the signal B to form the signal B', and OR circuit 34 combines the outputs of AND circuits 39 and 40 with the signal A to form the signal A'.

Signals W, X, Y and Z derived from the microinstruction field 2, are connected to respective first inputs of AND circuits 37–40, each of which is also provided with a second input. In each microinstruction field the signals W, X, Y, Z are assigned predetermined binary values which are either all 0, or a combination of one 1 and three 0's. The second inputs of AND circuits 38 and 39 are respectively connected to the lines carrying the signals A and B, and the second inputs of AND circuits 37 and 40 are connected to the complemented outputs $\bar{A}$ and $\bar{B}$ of inverters 36 and 35, respectively.

With the connections just described the signals B' and A' are represented by the Boolean expressions:

$$B'=B+W\bar{A}+XA \tag{1}$$

and $$A'=A+YB+Z\bar{B} \tag{2}$$

From expressions (1) and (2) it is clear that B' is a function of the variable instantaneous values of B and A in combination with the predetermined instantaneous values of control signals W and X, and A' is determined by a similar function of A and B together with the predetermined signals Y and Z.

As noted above the branch bit selecting signals U and V are plural digit quantities which are relatively independent of each other, whereas W, X, Y and Z are restricted in a mutually exclusive sense so that at most one of the latter will have a value of 1 in any microinstruction cycle.

Figure 4:
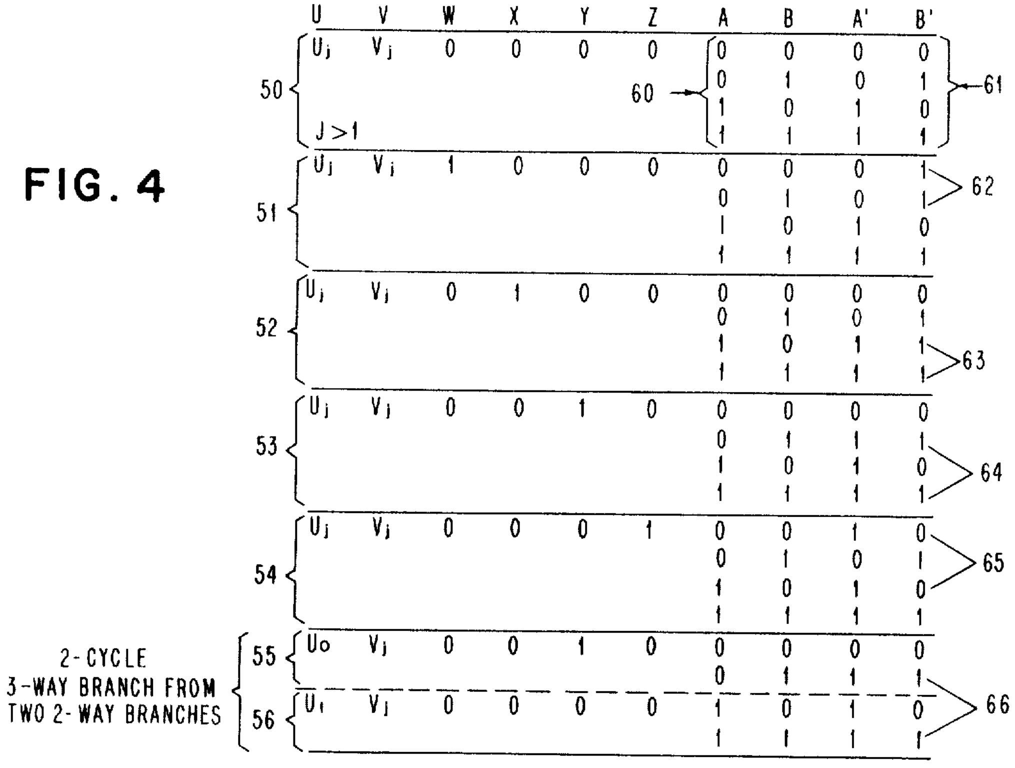
FIG. 4 is a diagrammatic illustration, in tabular form, of the various signal conditions which may occur in the system of FIG. 1.

Referring now to FIG. 4, various states of the signals U, V, W, X, Y, Z, A, B, A' and B', are examined in seven different microinstruction selection cycles, 50 to 56. In each of cycles 50 to 54, the values of U and V are indicated to be values $U_j$ and $V_j$ ($j$ greater than 1) which select variable signals $A_J$ and $B_j$ ($j>1$) as the A and B branch control bits. The intent in cycles 50 to 54 is to demonstrate the effect of the circuit 5 on pairs of bits A and B when both bits are variably determined (hence when $j>1$). In contrast to this, in cycles 55 and 56, which need not be consecutive, the indicated values of U, are the respective combinations $U_0$ and $U_1$ which select the constant binary signals $A_0=0$ and $A_1=1$ respectively, while the indicated value $V_j$ of V, remains representative of a combination for selecting a variable B bit.

Thus, in each of the cycles 50 to 54 the branch bit pair AB can have any of four conditions (00, 01, 10 or 11), as indicated, for example, at 60, and can therefore be used to determine a 4-way conditional branch in the selection of the next microinstruction address. In each of cycles 55 and 56, however, the pair AB can only have one of two conditions (00 or 01, in cycle 55, and 10 or 11 in cycle 56) because A has a predetermined value. Hence in each of the latter cycles AB can only be used to control a 2-way conditional branch. For further reference below it is noted that two 2-way branches as in cycles 55 and 56 conditioned only on a variable value of one of the branch control bits (e.g. B) while the other bit (e.g. A) is set first to one predetermined binary state and then to the opposite binary state, can have an effect analogous to a single cycle 4-way conditional branch since there are four distinct possibilities for the value of the pair AB in the two cycles.

When $W=X=Y=Z=0$, as in cycle 50, expressions (1) and (2) above reduce to:

(3) $B'=B$, and (4) $A'=A$, and therefore, as shown at 61, the value of A'B' will be the same as that of AB indicated at 60.

In cycle 51, however, wherein $W=1$, and $X=Y=Z=0$, expressions (1) and (2) reduce to:

(5) $B'=B+\bar{A}$ (i.e. B' is 1 if, and only if, B and/or the complement of A are/is 1), and $$A'=A \tag{6}$$

as a result of which, as indicated at 62, the first two values of A'B' which correspond to the first two values of AB, are equal to each other, and the last two values of A'B' are different. This then amounts to a "four to three transformation" of the AB code set.

Denoting the transformation just described as a single cycle "W" transformation, it may be seen that in cycles 52, 53, and 54, similar single cycle transformations, which may be designated X, Y, and Z transformations result from the respective setting of X, Y or Z to 1, while the other three of the parameters W, X, Y, and Z are set to 0. For $X=1$ (cycle 52) $B'=B+A$ (i.e. $B'=1$ if, and only if, B and/or A are/in 1) and $A'=A$. Hence the third and fourth values of AB (10 and 11) transform into the single value 11 as indicated at 63. For $Y=1$ (cycle 53) $B'=B$ and $A'=A+B$ (i.e. A' is 1 if, and only if, A and/or B are/is 1) whence the second and fourth values of AB (01 and 11) map into the single value 11 as shown at 64. When $Z=1$ (cycle 54) $B'=B$ and $A'=A+\bar{B}$ (A' is 1 if, and only if, A and/or the complement of B are/is 1), whereby, as shown at 65, the two AB values 00 and 10 map into the single A'B' value 10.

As shown at 66, in cycle 55, when $Y=1$, $U=U_0$, and $V=V_j$, the two possible values of AB which can be selected (i.e. the values 00 and 01) map into the two A'B' values 00 and 11 as in the Y-transformation of cycle 53. And in cycle 56, with $U=U_1$, $V=V_j$, the possible values of AB and A'B' are 10 and 11. Thus, four distinct possibilities for the values of AB in cycles 55 and 56, are transformed into the three values associated with the Y-transformation of cycle 51 with a 2-way conditional branch in each of two cycles.

It may readily be seen that if Z had been the controlling parameter in cycle 55 instead of Y, the possibilities for A'B' would correspond to those in cycle 54 but with a choice of two different possibilities in each of cycles 55 and 56.

If, however, W had been used as the controlling parameter in cycle 55, or X in cycle 56, the value of A'B' in that cycle would have been predetermined (i.e. there would have been an unconditional address selection) because, for example, the two equal A'B' values shown at 62 might then have been the possible values of A'B' in cycle 55. Unconditional selections of this sort can just as easily be produced by selection of predetermined values for AB via UV: e.g. via $U_0$ $V_0$, $U_0$ $V_1$, etc.

The illustrated example for cycles 55 and 56 demonstrates that it is possible to have two 2-way conditional branches in two distinct and not necessarily consecutive selection cycles, and yet select an address from a group of only 3 different micro-instruction addresses where previously 4 addresses were reserved for this purpose. It should be noted that in the 2-cycle transformation the P-field ($P_0$, $P_1$ . . . $P_9$) in the current microinstruction of the first and second cycles must be the same. Otherwise the two second cycle branch addresses would be different from both first cycle branch addresses.

While the term "2-cycle" has been applied to the selection procedure characterized at 55 and 56, this is not meant to imply that the selections at 55 and 56 must occur in any predetermined sequence to be effective. For example, one microinstruction $MI_p$ in the control store 1 can have as possible successor microinstruction addresses $SMA_1$ ($A'B'=00$) and $SMA_2$ ($A'B'=11$) and another microinstruction $MI_q$ entirely unrelated to $MI_p$, can have as possible successor addresses $SMA_3$ ($A'B'=10$) and $SMA_2$ ($A'B'=11$) in accordance with the plan illustrated at 55 and 56. However, were it not for the Y transformation in the selection of the successor to $MI_p$, it would have been necessary to duplicate the microinstruction stored at $SMA_2$ at a fourth address $SMA_4$ (corresponding to $AB=01$).

Figure 3:
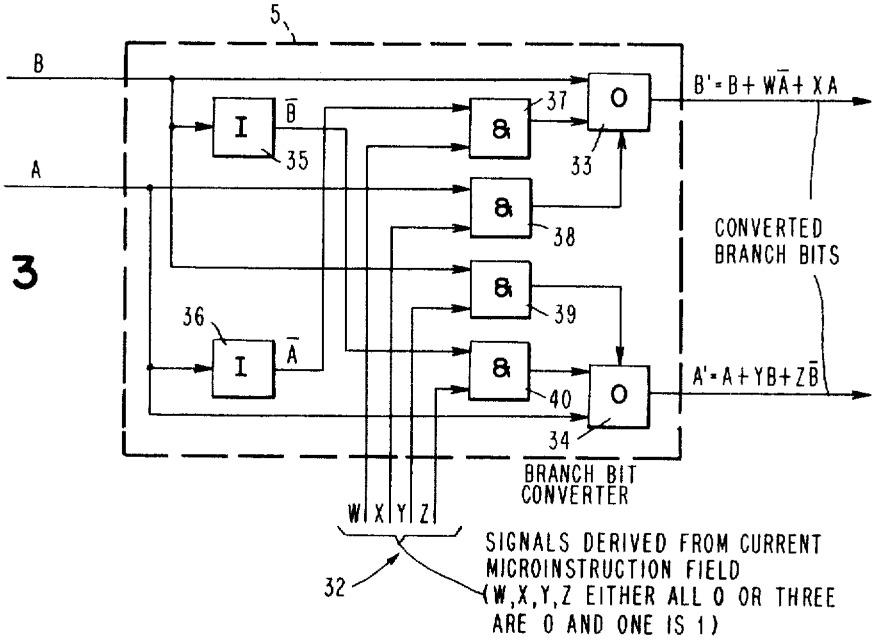
FIG. 3 is a schematic drawing showing details of a circuit in accordance with this invention for controlling the range of variation of selected branch control signals.

It is also noted that not only is the illustrated 2-cycle transformation in cycle 55 and 56 only an example of one of four such transformations which can be obtained from the arrangement of FIG. 1, but also, and even more significant perhaps, the arrangement of FIG. 3 cannot produce all 4-way to 3-way single cycle transformations. For example, it cannot transform $AB=00$ into $A'B'=11$, or $AB=01$ into $A'B'=10$. This, however, is a matter of design choice. In general a choice of four transformations such as that provided by the circuit of FIG. 3 will be adequate for most control storage organizations.

Having thus described one aspect of the invention, as it pertains to one and two cycle transformations of 4-way conditional branch parameters into 3-way branches, variations on this basic theme, and extensions thereof to applications involving an arbitrary number $n$ of branch control variables will readily occur to those skilled in the art, and it is intended that all such variations, within the scope and spirit of the invention as set forth herein, shall be subject to the protection afforded by the accompanying claims. For example, those skilled in the art will readily appreciate that if three of the four AND circuits 37–40 were omitted from the circuit of FIG. 3, a one-cycle 3-way branch effect could still be obtained upon energization of the remaining AND circuit. This, however, might impose an undesirable restriction on the microprogram designer because if two different 3-way branches, from two different microinstructions, must combine different members of the set of four possible successor microinstructions, such sharing of microinstructions could not be implemented by one fixed transformation.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a cyclically operable microprogram control system:

a source of a plurality of variable branch control signals, combinations of which are useful for variably determining branch selections of microinstructions;

means coupled to said source for translating said signals;

means coupled to said translating means for conditionally modifying one branch control signal of a combination by superimposing thereon a signal conditioned upon the instantaneous value of at least one signal in said combination; and means enabling the said modifying means in accordance with information in a previously selected microinstruction.

2. In a cyclically operable microprogram control system including means for cyclically producing control microinstructions in a selective sequence in response to variable combinations of binary branch control signals, the improvement for conditionally restricting the range of selection of said branch control signals to a range of M selection choices, where M is not an integral power of 2, comprising:

means operable to variably translate said branch control signal combinations to said microinstruction producing means;

said translating means including normally disabled means which can be operated to transform certain of said branch signal combinations into different combinations while translating all but said certain combinations without change, the total resulting combinations comprising at most M combinations, where M is not a power of 2;

means coupled to said translating means for conditionally operating said transforming means therein to act upon said branch control signals.

3. Microprogram sequencing controls comprising:

means operable to produce control micro instruction signals in a selective sequence;

a source of variable signals;

means responsive to certain information in each said microinstruction signal to produce a variable address signal including a selected combination of said variable signals for controlling the next selection of said microinstruction signal producing means; and means responsive to other information in each said selectively produced microinstruction signal to selectively modify a part of said variable combination in said address signal in accordance with a function of the instantaneous signals in said combination.

4. Microprogram controls for producing control microinstructions in variable microprogram sequences comprising:

means for producing microinstruction signals in a selective sequence;

means responsive to information in each said microinstruction signals to selectively produce an $n$-digit binary branch control signal for controlling the next selection made by said microinstruction signal producing means;

means operable to translate said branch control signals to said microinstruction signal producing means for controlling the selections thereof;

said translating means including means which can be operated to transform at least one, but not all of the possible value combinations of said branch control signals into other $n$-digit signal combinations, to limit the range of possible values of said translated branch control signals to an integral number of value combinations other than a power of the integer 2; and means for conditionally operating said transforming means in response to certain information in each said produced microinstruction signal.

5. An efficient organization of microprogram controls comprising:

means cyclically operable to selectively produce control microinstruction signals;

means responsive to one part of said said microinstruction signal to produce a variable address signal, including a pair of variable branch control bits, for controlling the next selection of a microinstruction signal by said microinstruction signal producing means;

means controllable by another part of each said microinstruction signal to conditionally superimpose a signal of predetermined value on at least one bit of said pair of branch control bits in accordance with the value of the other bit of said pair; and means controllable by still another part of each said microinstruction signal to select said branch control signals from a field including signals of constant value and other signals of variable value.

6. An efficient organization of microprogram controls comprising:

means cyclically operable to selectively produce control microinstruction signals;

means responsive to one part of each said microinstruction signals to produce a binary address signal, including a pair of variable branch control bits for variably controlling the next selection of said microinstruction signal producing means;

a plurality of means each capable of conditionally superimposing a predetermined signal representing a different function of both branch control bits, on at least one of said branch control bits; and means for conditionally operating an exclusive one of said plurality of means in accordance with another part of each said microinstruction signal.

7. An organization of controls as set forth in claim 6 wherein:

two of said microinstruction signals produced in different cycles of said microinstruction producing means contain information in said one and said another parts thereof for operating said branch control signal producing means and said predetermined signal superimposing means during the respective different cycles to provide an address signal in each said cycle based upon a conditional branch selection from a set of M distinct signal possibilities, where M is an integer other than a power of the number 2.

8. An efficient organization of microprogram controls comprising:

means cyclically operable to selectively produce control microinstruction signals;

a plurality of sources of branch control signals including predetermined and variable signals;

means responsive to a first part of each microinstruction signal to select a pair of first and second branch control signals for further handling;

first and second OR circuits each having first, second, and third inputs;

said first inputs of said OR-circuits receiving respective ones of said selected pair of branch control signals;

two pairs of AND-circuits; a first pair having output connections to the second and third inputs of said first OR-circuit, and a second pair of AND-circuits having output connections to the second and third inputs of the second OR-circuit;

the outputs of said OR-circuits connecting to said microinstruction signal producing means for controlling the sequential selection of microinstructions therein;

said AND-circuits each having first and second inputs;

said first inputs of said AND-circuits receiving four mutually exclusive signals derived from a second part of each said microinstruction signal;

first and second inverting circuits having inputs coupled to respectively receive said first and second branch control signals;

said first branch control signal and the output of said first inverting circuit connecting to respective second inputs of said second pair of AND-circuits; and said second branch control signal and the output of said second inverting circuit connecting to respective second inputs of said first pair of AND-circuits.

9. Controls organized according to claim 8 wherein:

a plurality of said microinstructions contain first and second parts which are related in sequence to invariably produce a selective branch signal transformation, and a corresponding transformed branch in the selection of microinstruction signals, over a plurality of cycles of operation of said microinstruction signal producing means in which the total number of microinstruction selection possibilities is other than an integral power of the number 2.

No references cited.

ROBERT C. BAILEY, *Primary Examiner.*

R. ZACHE, *Assistant Examiner.*